(12) United States Patent
Kimmel

(10) Patent No.: US 10,578,870 B2
(45) Date of Patent: Mar. 3, 2020

(54) EXIT PUPIL EXPANDER

(71) Applicant: Magic Leap, Inc., Plantation, FL (US)

(72) Inventor: Jyrki Sakari Kimmel, Tampere (FI)

(73) Assignee: Magic Leap, Inc., Plantation, FL (US)

( * ) Notice: Subject to any disclaimer, the term of this patent is extended or adjusted under 35 U.S.C. 154(b) by 168 days.

(21) Appl. No.: 15/659,732

(22) Filed: Jul. 26, 2017

(65) Prior Publication Data

US 2019/0033592 A1 Jan. 31, 2019

(51) Int. Cl.
*G02B 27/01* (2006.01)
*G02B 27/00* (2006.01)
*G02B 27/42* (2006.01)

(52) U.S. Cl.
CPC ..... *G02B 27/0172* (2013.01); *G02B 27/0081* (2013.01); *G02B 27/4205* (2013.01); *G02B 2027/0112* (2013.01)

(58) Field of Classification Search
CPC ............ G02B 27/0172; G02B 27/0081; G02B 27/4205; G02B 2027/0112
See application file for complete search history.

(56) References Cited

U.S. PATENT DOCUMENTS

| | | | |
|---|---|---|---|
| 7,719,767 B2 | 5/2010 | Lin et al. | |
| 8,064,138 B2 | 11/2011 | Taira et al. | |
| 8,400,537 B2 | 3/2013 | McCarten et al. | |
| 8,508,848 B2 | 8/2013 | Saarikko | |
| 2010/0079841 A1* | 4/2010 | Levola | G02B 6/0038 359/240 |
| 2011/0216266 A1 | 9/2011 | Travis | |
| 2014/0140654 A1 | 5/2014 | Brown et al. | |
| 2017/0115487 A1* | 4/2017 | Travis | G02B 27/0172 |
| 2017/0192239 A1* | 7/2017 | Nakamura | G02B 6/0036 |
| 2017/0329137 A1* | 11/2017 | Tervo | G02B 6/0026 |

FOREIGN PATENT DOCUMENTS

CN 103513422 A 1/2014

OTHER PUBLICATIONS

Tan et al., "A New Type Holographic Display Based on a Wedge-shaped Waveguide and Its Keystone Predistortion", Proceedings of SPIE, vol. 7232, Feb. 2009, pp. 72320V-1-72320V-8.

* cited by examiner

*Primary Examiner* — Kimberly N. Kakalec
(74) *Attorney, Agent, or Firm* — Stephen M. De Klerk

(57) ABSTRACT

An exit pupil expander (EPE) has entrance and exit pupils, a back surface adjacent to the entrance pupil, and an opposed front surface. In one embodiment the EPE is geometrically configured such that light defining a center wavelength that enters at the entrance pupil perpendicular to the back surface experiences angularly varying total internal reflection between the front and back surfaces such that the light exiting the optical channel perpendicular to the exit pupil is at a wavelength shifted from the center wavelength. In another embodiment a first distance at the entrance pupil between the front and back surfaces is different from a second distance at the exit pupil between the front and back surfaces. The EPE may be deployed in a head-wearable imaging device (e.g., virtual or augmented reality) where the entrance pupil in-couples light from a micro display and the exit pupil out-couples light from the EPE.

16 Claims, 8 Drawing Sheets

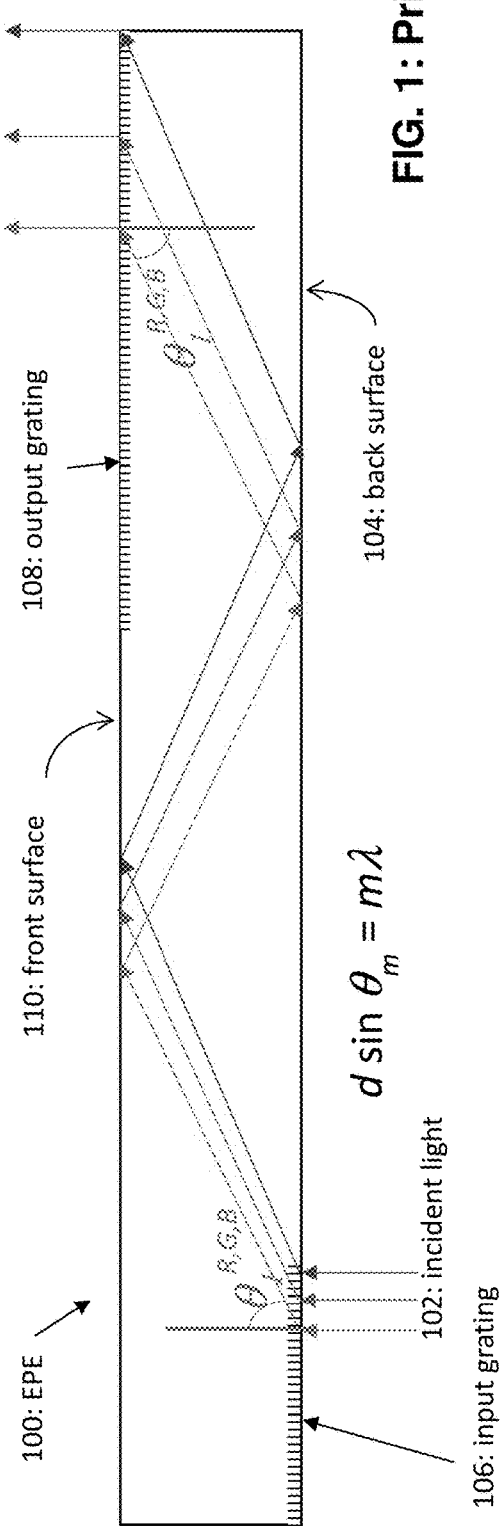
FIG. 1: Prior Art
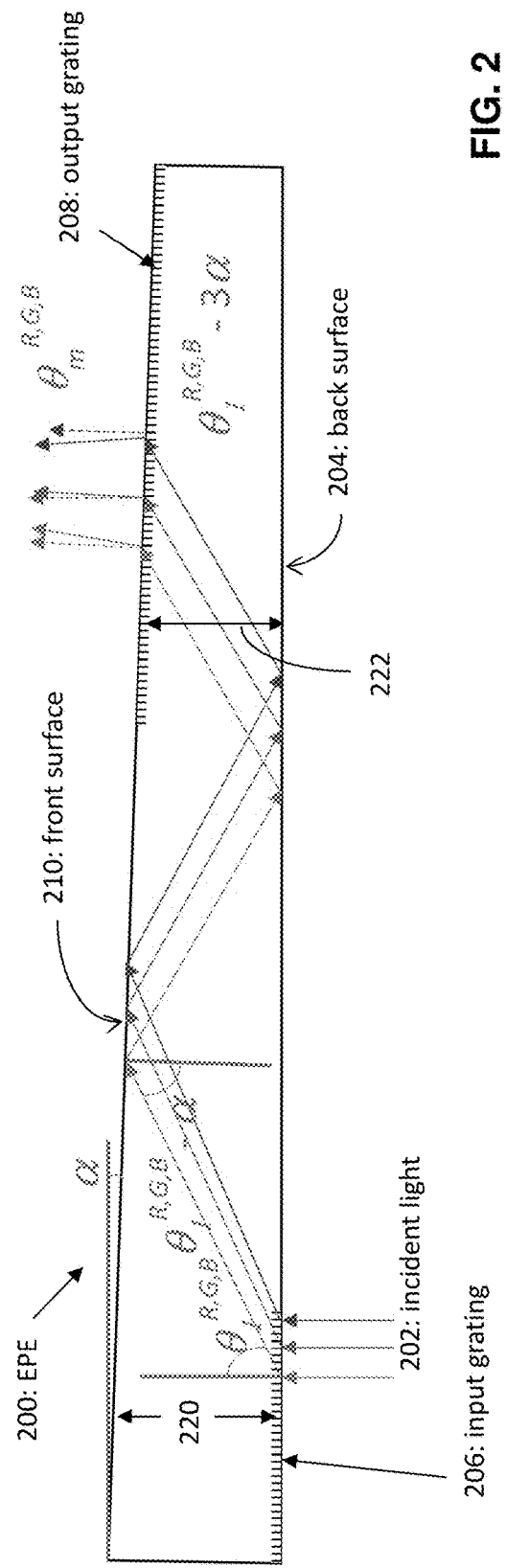
FIG. 2

FIG. 4

EXIT PUPIL EXPANDER

TECHNOLOGICAL FIELD

The described invention relates to optical channels, and more particularly to controlling the color space across the output grating of an optical exit pupil expander such as may be disposed in a head-wearable imaging device/computer that projects an image directly in front of a user's eye.

BACKGROUND

Certain wearable computers such as those embodied as eyeglasses or virtual technology goggles project an image directly in front of a user's eye. In eyeglass type devices these projections are see-through so the user can see the projected data in the near field while the visual real-world in the far field remains largely unobscured. In virtual reality devices the user is isolated from perceiving the real world so the display needs to fill the user's entire field of vision. One challenge with such wearable displays is to produce an adequate eye-box in which the viewer can view the data that is projected by the micro-display. Such an the eye-box for see-through displays measures about 10-12 mm in the vertical and in the horizontal and the eye relief is in the range of 20-30 mm. For virtual reality devices the eye box is necessarily larger and often the eye relief is a bit longer. Retinal scanning display devices project the image directly on the user's retina so the eye-box is smaller and the eye relief is closer to zero. Due to the nature of such wearable devices the space constraints limit the reach of the optics and so one challenge is to keep that eye-box from shrinking to only a few mm, given the optical train (often located at the side of the user's head for see-through displays) is limited by practical limits to the size of such wearable devices. These size limits to the optical train also adversely affect the color space seen by the user. Color space may be a peripheral matter for see through displays where only data is being displayed but is critical for virtual reality devices whose effectiveness relies on the display persuading a certain level of the user's consciousness that the scene represents more than only a virtual world.

The exit pupil expander (EPE) is the optical component that would replace the geometric optics that have traditionally been used to expand the size of the eye-box in head-wearable visual devices. In optics the exit pupil is a virtual aperture in that only rays which pass through this virtual aperture can exit the system. The exit pupil is the image of the aperture stop in the optics that follow it. The term exit pupil is sometimes also used to refer to the diameter of the virtual aperture. Unlike the optics of conventional cameras or telescopes, an exit pupil expander of a wearable virtual reality or see-through device is designed to display for near-distance viewing.

Numerical aperture expander is a less common term sometimes used with reference to retinal scanning displays which project an image through the pupil directly on the user's retina. The numerical aperture of the light emanating from display pixels determines the exit pupil size, and retinal scanning displays project a rastered image about the size of the user's eye pupil at an intermediate plane. Retinal scanning displays can be used for virtual reality applications.

Diffractive exit pupil expanders have diffraction gratings that pose an inherent problem in controlling the color space. Because of diffraction the input and output gratings diffract different color bands of light into different output angles. This results in the user's perception of the color space of the scene being displayed having a varying color balance across the user's field of view.

Conventional exit pupil expanders typically have a very high degree of parallelism which FIG. 1 demonstrates with parallel front and back surfaces of the EPE. Incident light 102 enters the EPE 100 via the back surface 104 and encounters an input grating 106. Light propagates inside the EPE 100 by multiple total internal reflections (TIR) and the color space is controlled by having a stack of EPE plates, for example separate plates for red (R) and green (G) as well as blue (B) primary color bands. Light exiting the EPE 100 is expanded by these internal reflections and passes through an output grating 108 and exits normal to the front surface 110, which is parallel to the opposed back surface 104. This plate stacking necessarily complicates the design and raises its cost. The individual beams in FIG. 1 represent different colors (R, G, B) each defining a different wavelength $\lambda$.

SUMMARY

According to a first aspect of these teachings there is an optical channel comprising an entrance pupil enabling light to enter the optical channel, an exit pupil enabling the light to exit the optical channel, a back surface adjacent to the entrance pupil, and a front surface opposite the back surface. In this particular aspect the optical channel is geometrically configured such that the light defining a center wavelength that enters the optical channel at the entrance pupil perpendicular to the back surface experiences angularly varying total internal reflection between the front and back surfaces such that the light that exits the optical channel perpendicular to the exit pupil is at a wavelength shifted from the center wavelength.

According to a second aspect of these teachings there is an optical channel comprising an entrance pupil enabling light to enter the optical channel, an exit pupil enabling the light to exit the optical channel, a back surface adjacent to the entrance pupil, and a front surface opposite the back surface. In this particular aspect the optical channel is configured such that a first distance at the entrance pupil between the front surface and the back surface is different from a second distance at the exit pupil between the front surface and the back surface.

According to a third aspect of these teachings there is a head-wearable imaging device comprising a micro display and an exit pupil expander. The head-wearable imaging device may for example be a virtual reality device or an augmented reality device. In either case the exit pupil expander comprises: an entrance pupil configured to in-couple light from the micro-display; an exit pupil configured to out-couple light from the exit pupil expander; a back surface adjacent to the entrance pupil; and a front surface opposite the back surface. In this embodiment, as with the optical channel of the first aspect, the exit pupil expander is geometrically configured such that the light defining a center wavelength that enters the optical channel at the entrance pupil perpendicular to the back surface experiences angularly varying total internal reflection between the front and back surfaces such that the light that exits the optical channel perpendicular to the exit pupil is at a wavelength shifted from the center wavelength. In another embodiment the exit pupil expander may be as described above for the optical channel according to the second aspect of these teachings.

BRIEF DESCRIPTION OF THE DRAWINGS

FIG. 1 is a schematic diagram illustrating a prior art exit pupil expander with parallel front and back surfaces according to the prior art.

FIG. 2 is a schematic diagram illustrating a wedge-shaped exit pupil expander with non-parallel front and back surfaces according to an embodiment of these teachings.

FIG. 4 quantitatively tabulates the color shift of red, green and blue light passing through a wedge-shaped EPE such as that shown at FIG. 2, with $\alpha=0.25$ degrees.

DETAILED DESCRIPTION

Figure 3:
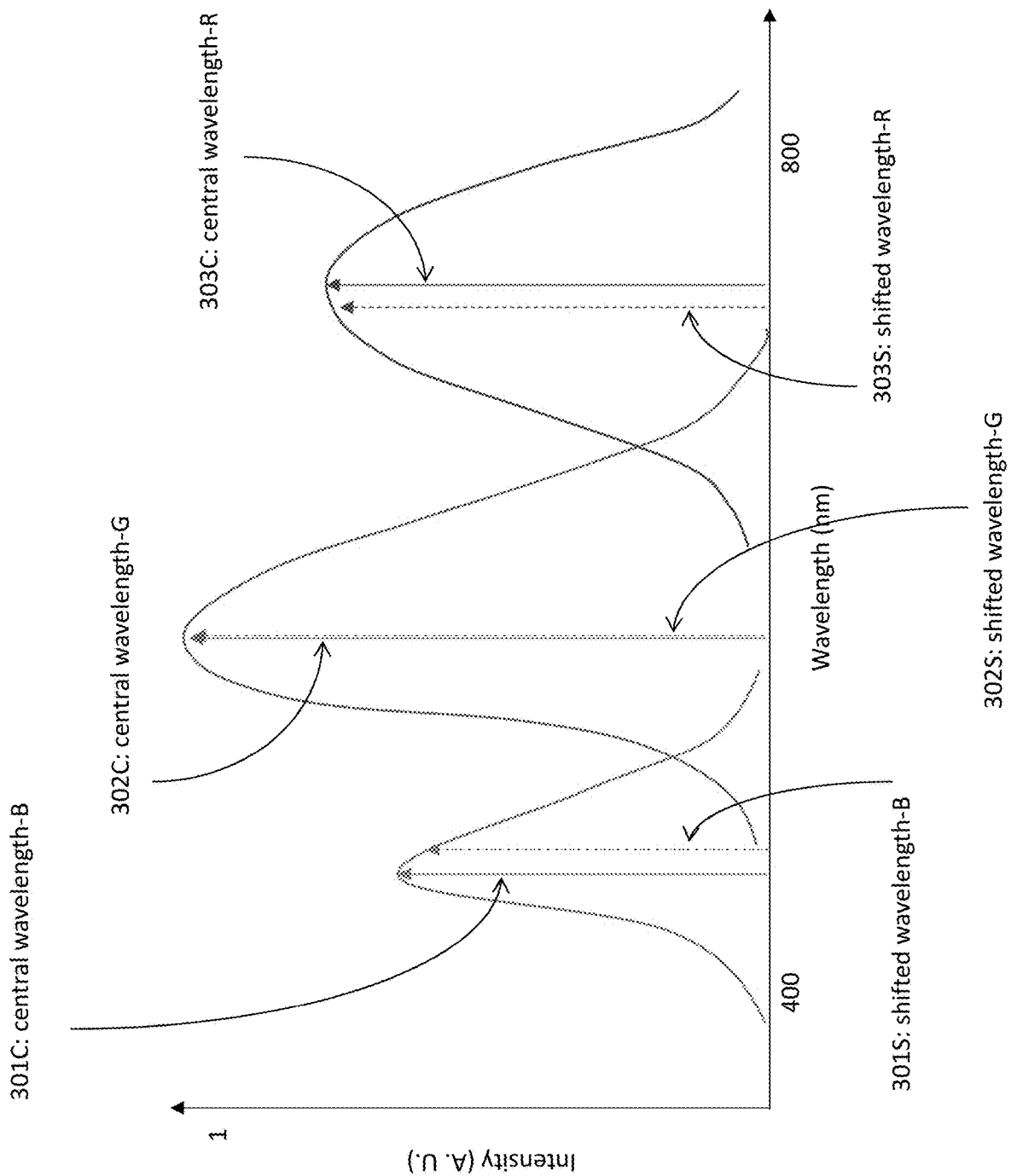
FIG. 3 is a plot of light intensity showing for each of R, G and B wavelengths a central peak and a shifted wavelength in the out-coupled light from a wedge-shaped EPE such as that shown at FIG. 2.

Certain non-limiting embodiments of these teachings provide a wedge-shaped EPE (exit pupil expander) plate for controlling color space as generally shown at FIG. 2. In the wedge-shaped EPE 200, the front 210 and opposed back 204 surfaces of the EPE 200 are non-parallel. These surfaces 204, 210 refer to internal reflective surfaces upon which the light reflects within the optical channel/EPE 200 and are sometimes referred to as plates. Light 202 propagates inside the EPE 200 through total internal reflection from these surfaces 204, 210 and experiences a varying degree of angular variation due to non-parallelism of these surfaces/plates 204, 210. Hence, at the output grating 208, the angular spread of the out-coupled light is affected and a user sees the angular shift as a color change of the light source as compared to the incident light 202 that was input through the back surface 204 at the input grating 206. That is, the wedge-shaped EPE 200 shifts the diffracted light from the central emitted wavelength of the light source, which in FIG. 2 is represented as the incident light 202. Improved color balance is achieved by controlling the wedge-shape of the EPE 200.

More particularly, the light reflecting off these surfaces 204, 210 propagating inside the wedge-shaped EPE 200 by TIR experiences a varying degree of angular variation, as a result of the non-parallelism of the surfaces/plates 204, 210. This affects the angular spread of the out-coupled light that exits the EPE 200 through the front surface 210 at the output grating 208. In particular, if light-emitting diodes (LEDs) are used as light sources (the incident light 202) for the optical engine providing the image, the user will see the resulting angular shift as a color change of the light source because the diffracted light is shifted from the dominant or from the central-emitted wavelength of the LED. The light that is coupled in with a slightly different wavelength is indicated by dashed arrows in FIG. 2 that exit normal/perpendicular to the front surface 210 while light at the wavelength peak exits somewhat offset from the normal. An improved color balance in the overall system can be achieved by controlling the wedge shape of the EPE 200, more particularly by controlling the extent of the non-parallelism of the internal reflective surfaces/plates 202, 210.

The optical channel/EPE 200 of FIG. 2 is configured such that a first distance 220 at the entrance pupil/input grating 206 between the front surface 210 and the back surface 204 is different from a second distance 222 at the exit pupil/output grating 208 between the front surface 210 and the back surface 204. The specific location of these distances 220, 222 in FIG. 2 is to avoid obscuring the ray traces through the channel; the appropriate locations would follow one particular ray of a given wavelength from input to output pupil (which are delineated in the drawings as input and output gratings) of the channel/EPE 200. In a particular but non-limiting embodiment the extent of the wedge is such that this wavelength ray tracing is not relevant to these distances, where for example a smallest first distance 220 anywhere along the entrance pupil/input grating 206 is larger than a largest second distance 222 anywhere along the exit pupil/output grating 208.

Consider this distinction between FIGS. 1 and 2 quantitatively. Assuming for simplicity that the characteristics of the input grating and the output grating are identical, the output coupled light experiences a color shift across the output grating. The grating equation $d \sin \theta_m = m\lambda$ (also shown at FIG. 1) describes the coupling angle of the light for each central wavelength $\lambda$ for Red, Green, and Blue. In FIG. 2, the improved color balance achieved by the wedged plates 204, 210 is shown. If the wedge angle $\alpha$ shown at FIG. 2 is chosen appropriately, the color shift across the output grating 208 is offset by the shift in the central wavelength of the respective light sources for R, G, and B. In FIG. 2 the central wavelength is followed with solid lines, and the shifted wavelengths are shown in dashed lines.

This is also shown in FIG. 3, where the spectra of the light sources are shown, with solid line indicators for the central (peak) wavelengths for Blue 301C; Green 302C and Red 303C as well as dashed line indicators for the shifted wavelengths for Blue 301S; Green 302S and Red 303S as seen by the user when the EPE is wedge-shaped as shown by the FIG. 2 example embodiment.

Figure 4:
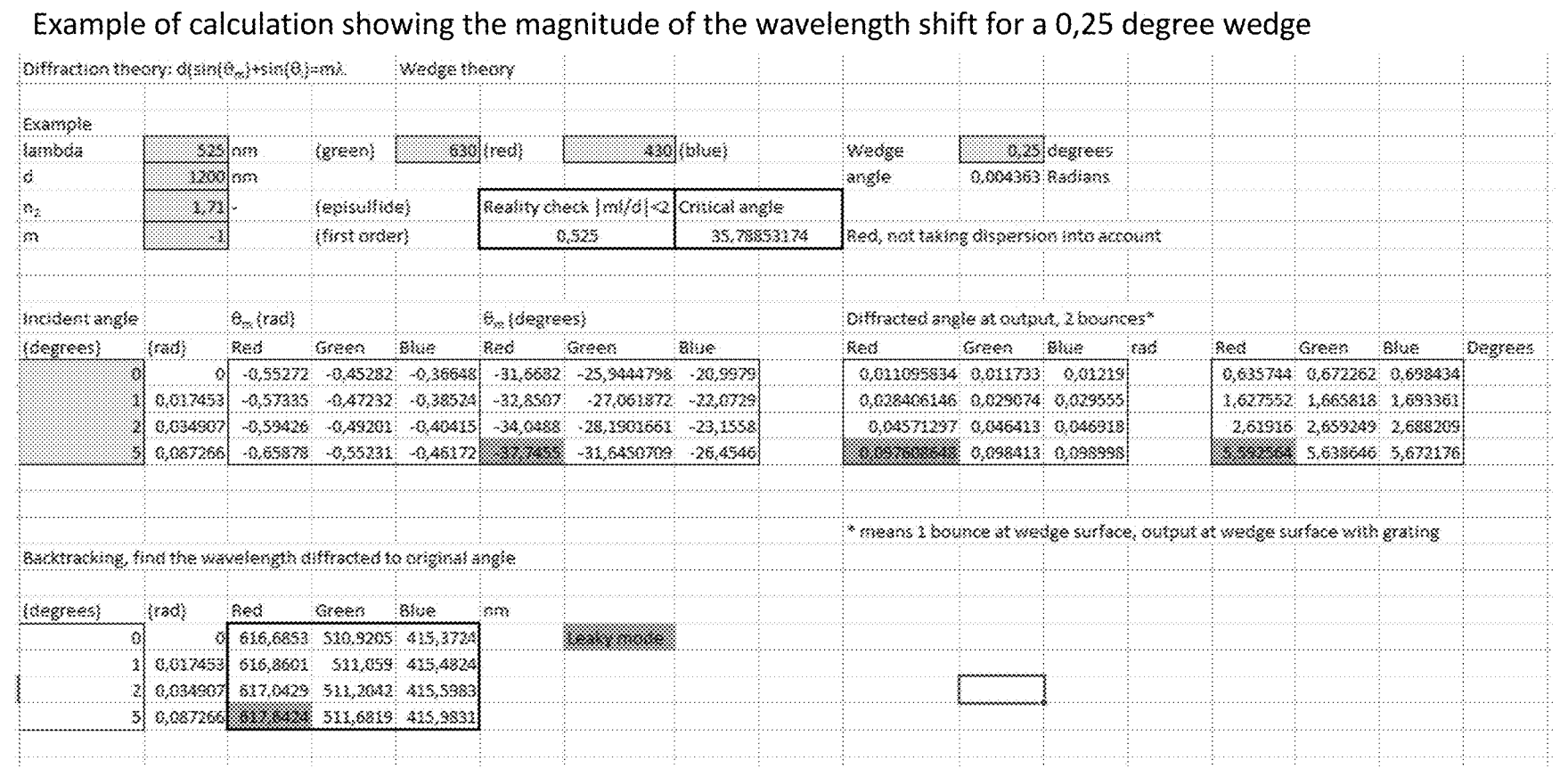

FIG. 4 reproduces the calculations for the color shifting plotted at FIG. 3. Green light input at the input grating has wavelength $\lambda=525$ nm; red light input has wavelength $\lambda=630$ nm; and blue light input has wavelength $\lambda=430$ nm. The wedge angle $\alpha$ shown at FIG. 2 is $\alpha=0.25$ degrees, the distance between slits on the input grating is $d=1200$ nm (consistent with the assumption above the input and output gratings are identical), $\theta_m$ is the diffraction angle at which phases add to produce a maxima, and air is the medium within the EPE. As can be seen from FIG. 4 the color shift $\Delta\lambda$ of green light is $\Delta\lambda \approx (525-511 \text{ nm}) = 14$ nm $\approx 2.5\%$; the color shift of red light is $\Delta\lambda \approx (630-617 \text{ nm}) = 13$ nm $\approx 2.0\%$; and the color shift of blue light is $\Delta\lambda \approx (430-415 \text{ nm}) = 15$ nm $\approx 3.5\%$. At least for the narrowing wedge shape the color shift is more pronounced for shorter wavelengths. FIG. 4 also shows the angular differences between the diffracted input and output angles. If the value of the angle $\alpha$ were set to zero the resulting EPE would be as shown at FIG. 1 and the calculations shown at FIG. 4 would return to the original (input) wavelength and the output angles would be equal to the input angles.

The basic wedge-shaped EPE 200 is only one of several EPE designs that will produce a color shift in the out-coupled light according to these teachings. While the FIG. 2 example shows the wedge narrowing between the input 202 (input grating 206) and the output (output grating 210) a similar color shifting benefit can be achieved with an expanding or widening wedge shape.

Figure 5:
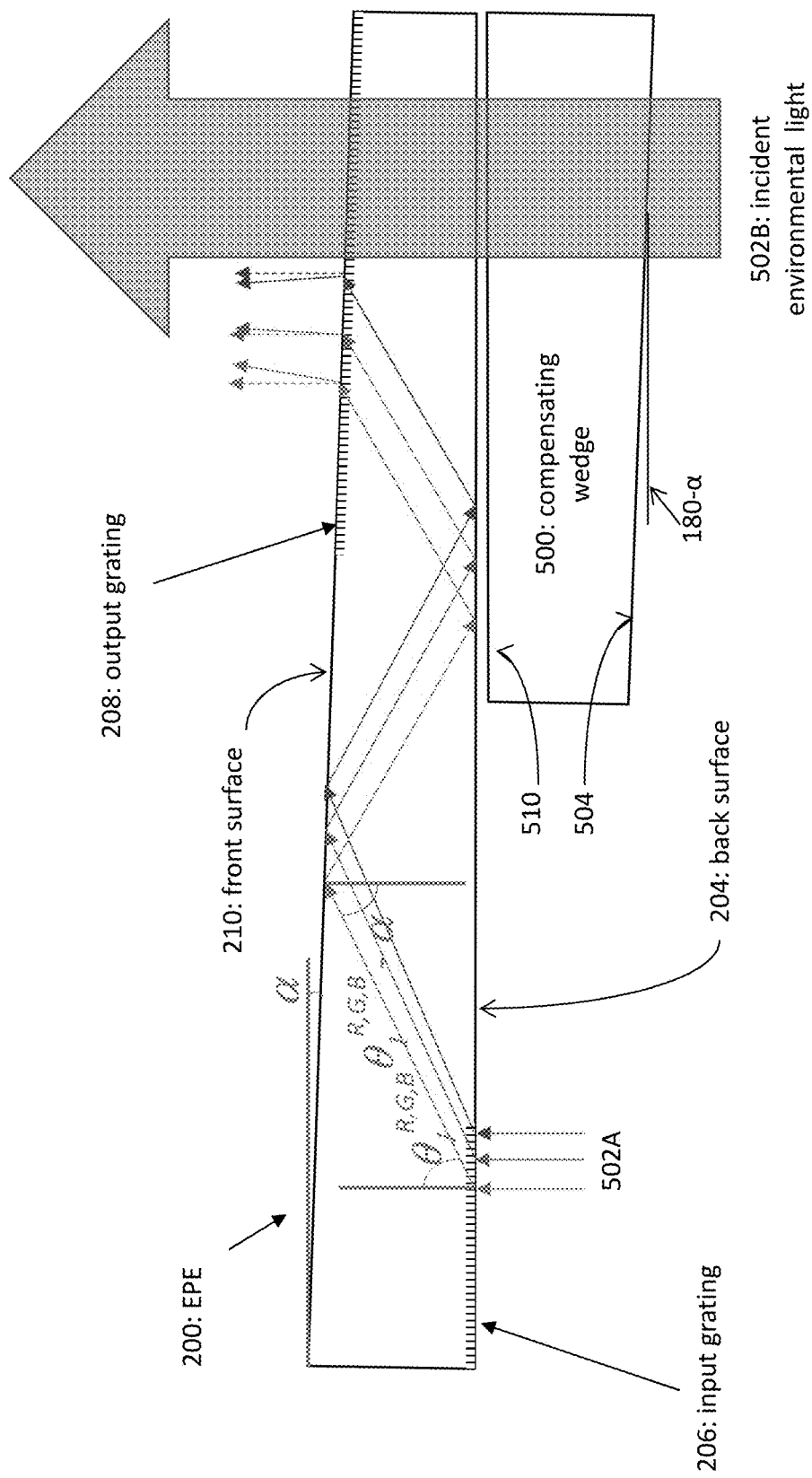
FIG. 5 is similar to FIG. 2 but further illustrating a compensating wedge for see-through (non-virtual reality) type applications according to an example embodiment.

FIG. 5 illustrates how a basic wedge-shape such as that shown at FIG. 2 can be adapted for a see-through display such as an eye-glass mounted micro-display that is transparent to visible light from the user's environment. Like reference numbers denote similar features as detailed above with respect to FIG. 2. For such a non-virtual reality device the user will want to perceive his/her surroundings without the color-shifting aspects imposed by the wedge shaped EPE 200. The incident light 202 forming the image to be projected in front of or on the user's eye is designated 502A in FIG. 5 to distinguish over the incident environmental light 502B that the user perceives directly that is not subject to internal reflection off the non-parallel surfaces 204, 210 within the EPE 200. That incident environmental light 502B passes through a compensating wedge 500 that defines opposed surfaces 510, 504 such that the surface 510 adjacent to the wedge-shaped EPE 200 is parallel to the back surface 204 of the EPE 200 and the surface opposite the EPE 200 is parallel to the front surface 210 of the EPE 200. So while the non-parallelism of the EPE 200 narrows between the input and output pupils, the compensating wedge widens to exactly match across the expanse of the compensating wedge 500 (or at least across the entrance and exit pupils of that compensating wedge 500). The angle α shown for the EPE 200 is the same angle α used for the compensating wedge 500 but offset 180 degrees (shown as 180−α on the compensating wedge 500). Aberrations to the incident environmental light 502B due to the angular difference between opposed surfaces 204, 210 of the EPE 200 are exactly offset by the angular difference between opposed surfaces 510, 504 of the compensating wedge 500, which may even be separate from the EPE 200 waveguide.

Figure 6:
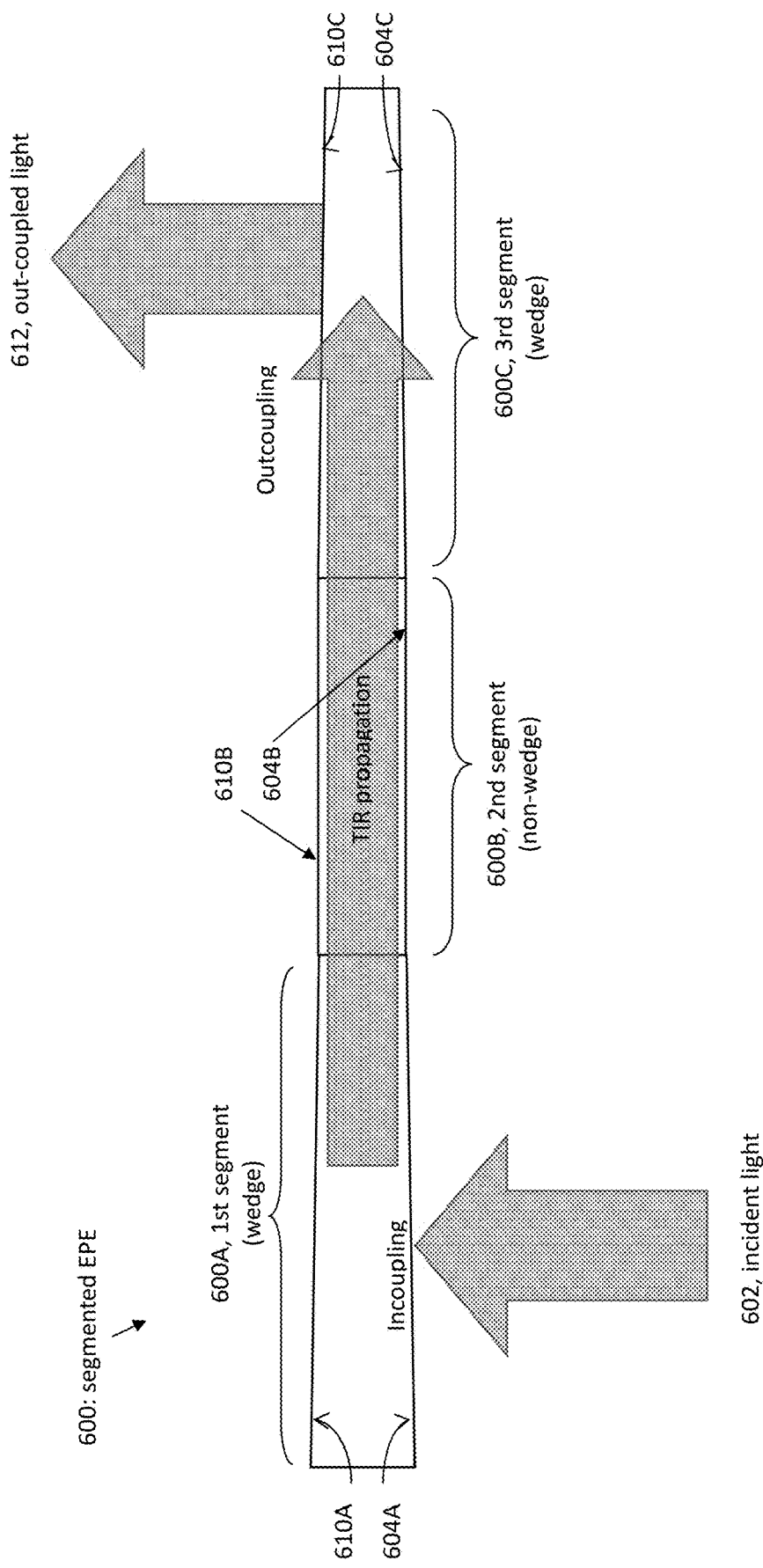
FIG. 6 is a schematic diagram of a segmented exit pupil expander defining multiple discrete segments of which less than all segments impose angularly varying total internal reflection according to these teachings.

Similar color-shifting advantages can be realized with one or more segmented wedge-shapes intermediate between the input and output of the EPE in which case the input and output surfaces at which the input and output gratings are disposed can be parallel themselves, as shown by example at FIG. 6. This segment-wise wedged EPE 600 defines three distinct segments 600A, 600B, 600C through which the incident light 602 propagates. Incident light 602 from the computer of the overall optical headset/eyeglass device forming the image to be projected is in-coupled through the back surface 604A of the first segment 600A which defines a narrowing wedge between opposed internal reflective surfaces 604A and 610A. From this first segment 600A the light continues through the second segment 600B which has parallel opposed internal reflective surfaces 604B, 610B. The light continues into the third segment 600C where it is out coupled 612 after reflecting between back 604C and front 610C surfaces which also define a narrowing wedge. In various embodiments there may be only one wedge segment 600A, 600C, and if there are multiple wedge segments 600A, 600C they may define the same or different wedge angles α. At least input and output gratings similar to those shown at FIG. 2 are assumed though not shown at FIG. 6, and further the second segment 600B with parallel opposed surfaces 604B, 610B may also incorporate diffraction gratings along those surfaces.

It is known to incorporate into the design of an EPE intermediate vertical expansion gratings, which in FIG. 1 would run vertically between the opposed surfaces 104, 110. Where such vertical expansion gratings are used in a multi-segment EPE 600 such as that shown at FIG. 6 they are preferably disposed in the second segment 600B which exhibits a high degree of parallelism between the opposed surfaces 604B, 610B. In this case the wedge can be on either side of the non-wedge segment 600B in which the intermediate vertical expansion plates are disposed, or in other embodiments there may be one or more wedge segments before or after the non-wedge parallel segment 600B.

While the embodiments illustrated herein show non-parallel planar surfaces similar advantages can be gained where one or both of such surfaces are curved. The result is qualitatively similar in that the color expansion arises from the non-parallelism of these opposed reflective surfaces but the computations are more extensive to realize a practical EPE as compared to planar non-parallel surfaces.

Figure 7:
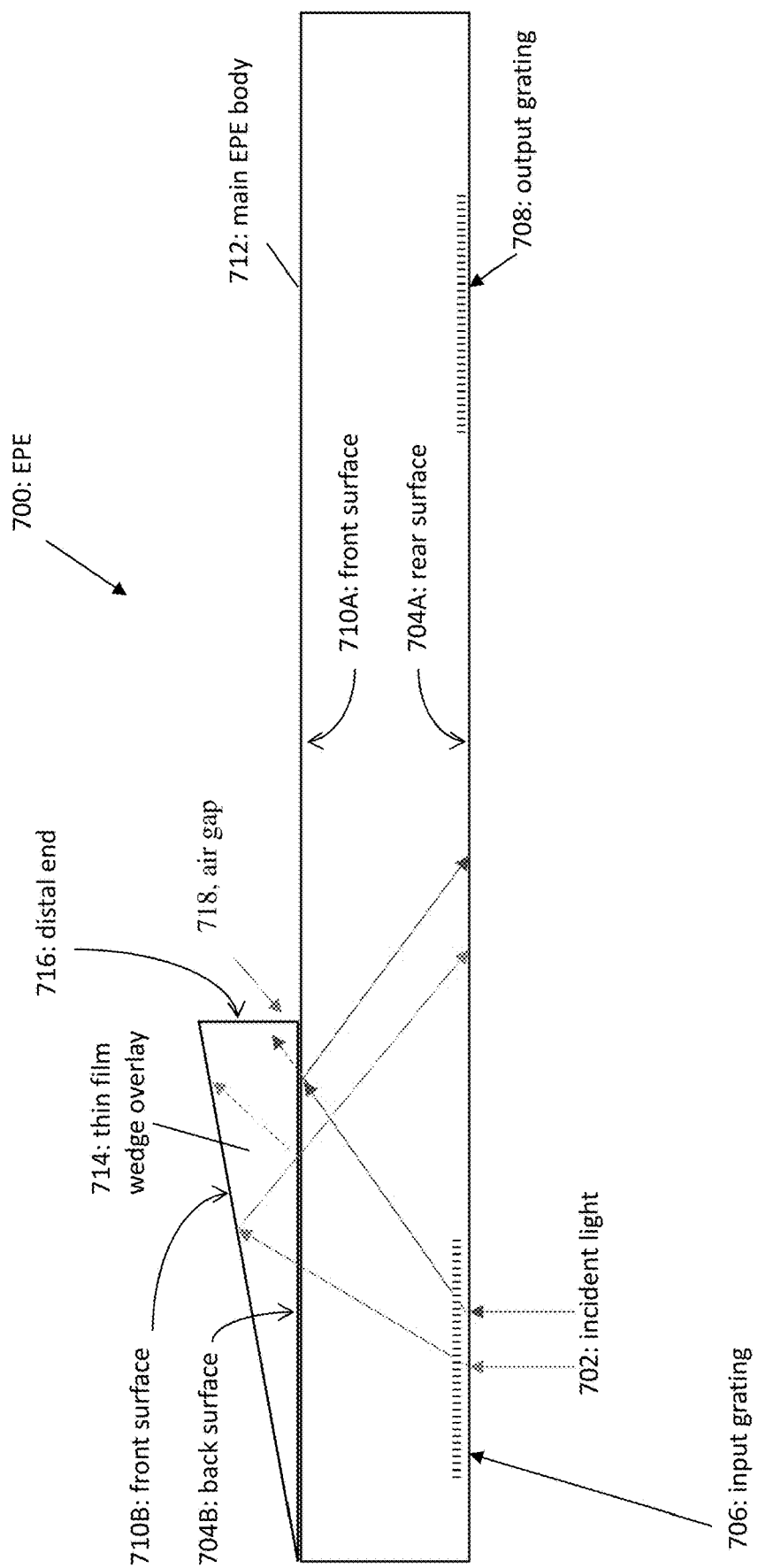
FIG. 7 is a schematic diagram of an exit pupil expander that includes a main channel or body with a thin film wedge overlay that imposes the angularly varying total internal reflection according to these teachings.

FIG. 7 illustrates a further embodiment of an EPE 700 in which there is a thin film wedge 714 overlying the front surface with a thin air gap 718 between the thin film wedge 714 and the main EPE body 712. Optical mediums other than air may also be used for this thin gap. For simplicity the main EPE body 712 has parallel opposed surfaces 704A, 710A. As with FIGS. 1 and 2 incident light 702 enters through the back surface 704A at the input grating 706 and is refracted internal of the channel between those surfaces 704A, 710A. The wedge overlay 714 is disposed opposite that input pupil such that the first refraction at the input grating directs the light towards the wedge overlay 714, which extends along only a portion of the main EPE body 712. The extent of that portion depends on the characteristics of that first diffraction angle and the wavelength or wavelengths the designer selects for evanescent coupling back into the optical channel of the main EPE body 712. The example at FIG. 7 shows blue and red light are incident 702; blue at the left and red at the right of the input grating 706. The blue light reflects into the thin film wedge 714 which extends far enough that a portion of this same blue light is also reflected from its front surface 710B through its back surface 704B to re-enter the main EPE body 712. The distal end 716 of the wedge overlay 714 prevents similar reflection of the red light that entered the wedge overlay 714 from being reflected back into that main EPE body 712. In this manner the 'leaky' input light can be filtered in and other wavelengths of light can be filtered out by selection of the wedge angle of the wedge overlay 714 and the position of the distal end 716 (for a given input grating 706).

In the FIG. 7 embodiment the output grating 708 is disposed along the rear surface 704A to show the advantages of these teachings do not depend on light being out-coupled from the surface opposite where it was in-coupled, and this feature can be incorporated into any of the other examples herein (except for the see-through embodiment of FIG. 5 it would be realized by in-coupling and out-coupling through the front surface 210 to retain the see-through feature). Some conventions prefer to name the surface adjacent to the output grating as the front surface, in which case surface 704A of FIG. 7 would be named the front surface and surface 710A would be named the back/rear surface; the terms front and back or rear surfaces as used herein merely designate opposing surfaces and the input/output pupils are specifically illustrated so there is no ambiguity. Note that the micro-display which provides the image seen by the user is not particularly shown at FIGS. 1-8; the micro-display and optical engine of the host device is the source of the incident light 702 that is in-coupled to the EPE via the input grating and out-coupled from it via the output grating. Microdisplays and optical engines to drive them are well known in the head-wearable visual imaging arts; these known microdisplays and optical engines are suitable for providing the image that is in-coupled to the EPE embodiments described herein and need not be further detailed. In some embodiments of optical devices such as retinal scanning displays the image is projected directly on the user's retina and such embodiments may or may not have any output grating at the exit pupil of the EPE.

Figure 8:
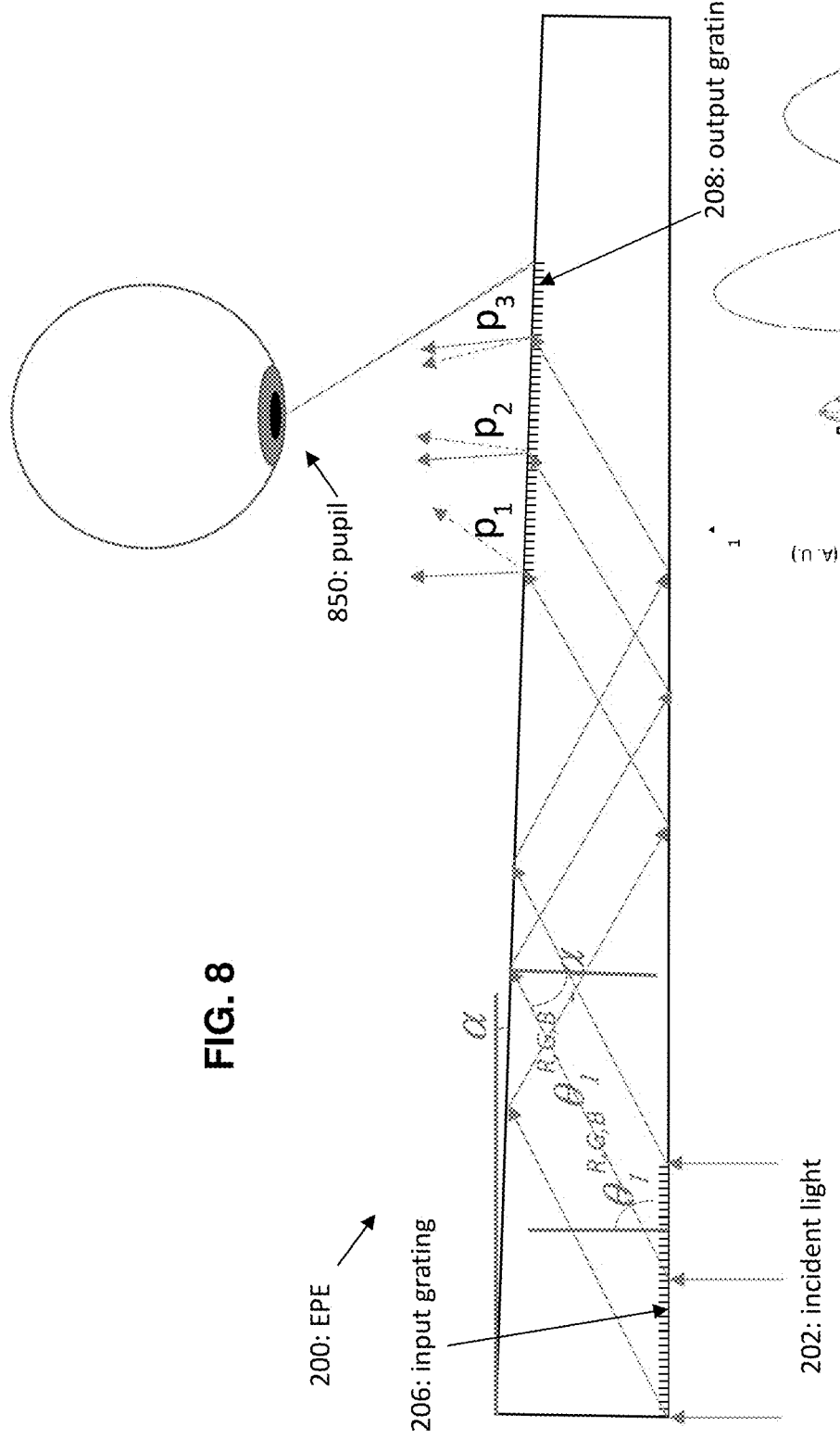
FIG. 8 is a schematic diagram of a wedge-type exit pupil expander similar to that of FIG. 2, but along with the inset FIG. 8A which is similar to FIG. 3 these more fully illustrate exit pupil expansion of only a single wavelength/color.

FIG. 8 illustrates a basic wedge-type EPE 200 similar to that shown at FIG. 2 but illustrating field of view aspects of these teachings; the inset at FIG. 8A is similar in kind to the data plot of FIG. 3. In this illustration the user's field of view is illustrated for only one color, blue which is incident 202 across the entire input grating 206 at zero degrees (normal to the plane of the grating). The solid arrows out-coupled from the output grating 208 represent the directions of the central peak of the color, and this central peak is also delineated at the inset with a solid arrow. The dashed arrows out-coupled from the output grating 208 show the side of the spectrum color that are coupled towards the user's pupil 850, where the dashed arrows $p_1$, $p_2$ and $p_3$ also illustrated at the inset. Note that those dashed arrows are on either side of the color peak even for this basic wedge design. When the user looks at the image projected on the output grating 208 the field of view has the color error that is imposed by the non-parallel channel of the EPE 200, so long as this error is not otherwise compensated within the EPE 200.

One particular technical effect of embodiments of these teachings is an improved color space provided by augmented reality and virtual reality viewing devices, and at a reduced cost. Such augmented reality or virtual reality devices would need to be designed such that the characteristics of the diffraction gratings take into account the wedge angle α but this would be an engineering matter more than compensated by volume sales of these retail end user devices.

Certain of the above embodiments may be described in part by its functionality as an optical channel (the EPE) comprising an entrance pupil enabling light to enter the optical channel; an exit pupil enabling the light to exit the optical channel; a back surface 204 adjacent to the entrance pupil; and a front surface 210 opposite the back surface. In the drawings the entrance pupil is designated by the input grating 206 and the exit pupil is designated by the output grating 208; while typical embodiments will have such gratings at those entrance and exit pupils the gratings themselves are not an essential part of the novel aspects of the optical channel/EPE presented herein. As detailed more particularly above the optical channel/EPE is geometrically configured, that is its shape is designed, such that the light defining a center wavelength that enters the optical channel at the entrance pupil perpendicular to the back surface experiences angularly varying total internal reflection between the front and back surfaces such that the light that exits the optical channel perpendicular to the exit pupil is at a wavelength shifted from the center wavelength. The dashed lines exiting the output grating 208 are perpendicular, and FIG. 3 as well as the inset FIG. 8A illustrate the shift of the dashed line wavelengths as compared to the solid-line peak which is the wavelength that entered the channel at the input grating 206.

Further to the aspects of the invention demonstrated by FIG. 3, in those embodiments the center wavelength (solid line) of the light is expanded by the angularly varying total internal reflection such that a) a first portion of the expanded light that exits the optical channel perpendicular to the exit pupil (the dashed lines) is at a wavelength shifted from the center wavelength; and b) a second portion of the expanded light that exits the optical channel non-perpendicular to the exit pupil (the solid lines) is at the center wavelength. The solid versus dashed line peaks at both FIGS. 3 and 8A show that this second portion of the expanded light that exits the optical channel non-perpendicular to the exit pupil exhibits a greater intensity than the first portion of the expanded light that exits the optical channel perpendicular to the exit pupil.

In the described embodiments the optical channel is geometrically configured such that the front surface and the back surface are non-parallel. While flat non-parallel surfaces are shown curved surfaces can also be employed to take advantage of these teachings. In the specific embodiment of FIG. 5 for a non-virtual reality implementation, the front surface 210 is adjacent to the exit pupil and the optical channel 200 is a see-through exit pupil expander further comprising a compensating wedge 500 disposed adjacent to a portion of the back surface 204 opposite the exit pupil, and this compensating wedge is transparent to incident environmental light 502B and is further geometrically configured to offset angular variance that the optical channel 200 imposes on incident environmental light 502B that passes into the optical channel via the compensating wedge.

FIG. 6 demonstrated an example of a segmented EPE 600, and in this case the front and back surfaces define at least first (600B) and second (600A and/or 600C) discrete geometric segments of the optical channel, wherein the front and back surfaces are parallel in the first discrete geometric segment 600B and non-parallel in at least the second discrete geometric segment 600A/600C.

Another embodiment shown particularly at FIG. 7 had the optical channel/EPE comprising a main channel or body 712 and a wedge overlay 714. In this case the front and back surfaces mentioned above would be considered the front 710A and rear 704A surfaces of the main channel 712; the wedge overlay would define non-parallel front 710B and back 704B overlay surfaces; the wedge overlay would be disposed adjacent to the front surface 710A of the main channel opposite the entrance pupil; and at least some of the angularly varying total internal reflection between the front and back surfaces are between the front surface 710B of the wedge overlay 714 and the back surface 704A of the main channel 712. For simplicity but not by way of limitation we can assume an embodiment with a wedge overlay in which the front 710A and rear 704A surfaces of the main channel 712 are parallel; a particularly useful aspect of the wedge overlay concept is that disposition of a distal end 716 of the wedge overlay 714 relative to the entrance pupil filters incident light 702 passing through the entrance pupil such that only wavelengths above or below a threshold experience the angularly varying total internal reflection while remaining wavelengths experience total internal reflection that is not angularly varying. These are respectively shown by the leftmost ray entering the input grating 706 which is reflected from the front overlay surface 710B back into the main channel 712 and by the rightmost ray entering the input grating 706 which is not reflected 710B back into the main channel 712 from the wedge overlay 714 due to the location of the distal end 716.

Alternatively, certain embodiments of these teachings may be described by the channel's geometry and without functional terms. For example, such an optical channel 200 comprises an entrance pupil enabling light 202 to enter the optical channel; an exit pupil enabling the light to exit the optical channel; a back surface 204 adjacent to the entrance pupil; and a front surface 210 opposite the back surface. As above, the drawings depict the entrance pupil as the input grating 206 and the exit pupil as the output grating 208, and such gratings may be common to most implementations but are not essential, particularly the output grating is not needed if the host device is of the retinal scanning variety. In this way of describing the invention the optical channel is configured such that a first distance 220 at the entrance pupil between the front surface 210 and the back surface 204 is different from a second distance 222 at the exit pupil between the front surface 210 and the back surface 204.

In one such embodiment such as that shown at FIGS. 2 and 5, the front and back surfaces of the optical channel are configured to form a continuous wedge defining an angle α that quantifies an amount of non-parallelism between them. Those particularly illustrated embodiments have the first distance greater than the second distance, but an opposite arrangement is also possible within these teachings.

Though the FIG. 5 embodiment is shown as a continuous wedge this is a non-limiting feature of the see-through/non-virtual reality embodiment of the exit pupil expander where the front surface 210 is adjacent to the exit pupil. In this embodiment the see-through exit pupil expander further comprises a compensating wedge 500 disposed adjacent to a portion of the back surface 204 opposite the exit pupil, and as detailed above this compensating wedge is transparent to incident environmental light 502B and geometrically configured to offset exit pupil expansion that the optical channel/EPE 200 imposes on incident environmental light 502B that passes into the optical channel/EPE via the compensating wedge 500.

The FIG. 6 embodiment has the front and back surfaces defining at least first and second discrete geometric segments of the optical channel, wherein the front and back surfaces are parallel in the first discrete geometric segment and non-parallel in at least the second discrete geometric segment as detailed above in the functional description of the FIG. 6 embodiment.

The embodiment detailed with respect to FIG. 7 has the optical channel comprising a main channel 712 and a wedge overlay 714, and this also is fully described above in the functional description of this embodiment.

Embodiments of these teachings include the overall host device in which such an optical channel/EPE may be deployed. Such a host device is shown by example at FIG. 9 as a head-wearable imaging device which comprises a micro display that would be disposed at the image source 904 and an exit pupil expander disposed between the source 904 and the eyepiece as shown. In such embodiments the exit pupil expander may be as detailed more particularly above with entrance and exit pupils to respectively in-couple and out-couple light from the micro-display and front and back surfaces to angularly vary the total internal reflection of the light passing between those pupils. In some embodiments at least a portion of these front and back surfaces are non-parallel to one another and this region is where the light experiences the angularly varying total internal reflection; as particularly shown at FIGS. 2 and 5-8 these non-parallel portions are flat. In some deployments the head-wearable imaging device is a virtual reality imaging device that isolates the user's field of view from the surrounding environment. In other deployments the head-wearable imaging device is an augmented reality device such as the particular example shown at FIG. 9, in which case there may further be a compensating wedge along the lines of the example at FIG. 5 and disposed opposite the exit pupil such that incident environmental light 502B passes into the exit pupil expander 200 through the compensating wedge 500 and passes out of the exit pupil expander through the exit pupil without total internal reflection.

Figure 9:
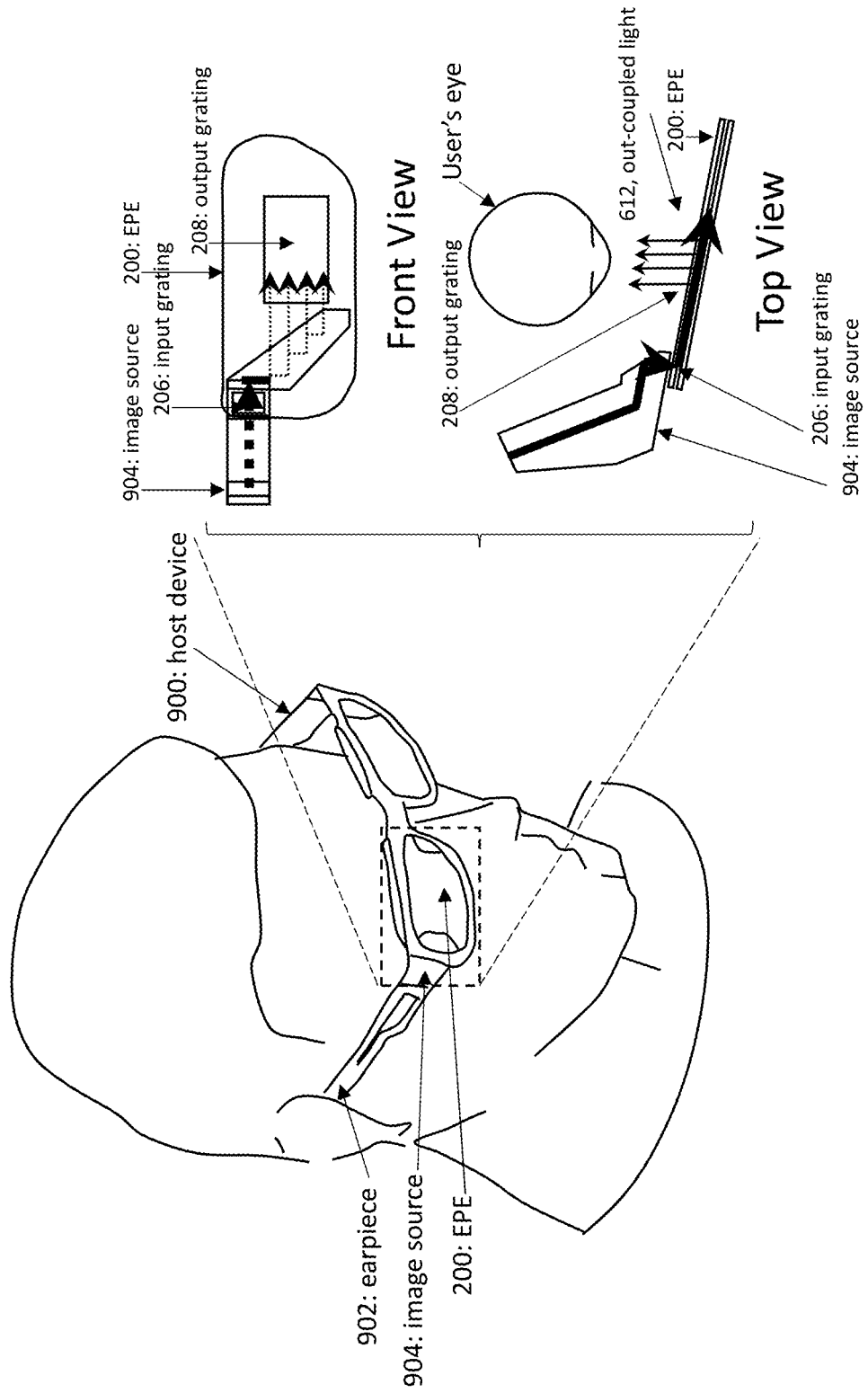
FIG. 9 is a perspective view of a non-virtual reality headset which is one type of device 900 in which embodiments of these teachings may be disposed, with front and top views particularly illustrating one example for placement of an EPE.

FIG. 9 is a perspective view of a non-virtual reality headset which is one type of device 900 in which embodiments of these teachings may be disposed. Typically in host devices that are implemented as eyeglasses such as the host device 900 shown at FIG. 9 the EPE 200 would be disposed to lie along the user's temple when the device is worn, either within the earpiece 902 or separately but substantially alongside the earpiece as FIG. 9 specifically shows. For virtual reality type host devices the EPE 200 may be disposed along the user's temple as FIG. 9 illustrates, or it may be disposed to run laterally along the user's face from the temple to the eye center. In any case there is a computer based image source 904 that provides the incident light to the entrance aperture/input grating for expansion and projection at or from the exit pupil/output grating. In some embodiments the image source 904 may generate the image itself, in others it may include a wireless receiver that receives the digitized image over a Bluetooth or other wireless connection and simply renders the received image for visual presentation.

The various embodiments presented herein provide a fuller appreciation for the scope of the teachings herein, but these are examples and do not themselves represent an inherent limit to the various types of embodiments that can exploit the teachings herein, whether such embodiments relate to the EPE itself or as to how it may be disposed on or within a host device.

What is claimed is:

1. An optical channel comprising:
   an optical channel body;
   an entrance pupil enabling light to enter the optical channel body;
   an exit pupil enabling the light to exit the optical channel body;
   a back surface adjacent to the entrance pupil;
   a front surface opposite the back surface, wherein the optical channel body is geometrically configured such that the front surface and the back surface are non-parallel; wherein the optical channel body is geometrically configured such that the light defining a center wavelength that enters the optical channel body at the entrance pupil perpendicular to the back surface experiences angularly varying total internal reflection between the front and back surfaces such that the light that exits the optical channel body perpendicular to the exit pupil is at a wavelength shifted from the center wavelength;
   and
   a wedge overlay, wherein:
   the said front and back surfaces are front and back surfaces of the optical channel body;
   the wedge overlay defines non-parallel front and back overlay surfaces;
   the wedge overlay is disposed adjacent to the front surface of the optical channel body opposite the entrance pupil; and
   at least some of the angularly varying total internal reflection between the front and back surfaces are between the front surface of the wedge overlay and the back surface of the optical channel body.

2. The optical channel according to claim 1, wherein the center wavelength of the light is expanded by the angularly varying total internal reflection such that:

a first portion of the expanded light that exits the optical channel body perpendicular to the exit pupil is at a wavelength shifted from the center wavelength; and a second portion of the expanded light that exits the optical channel body non-perpendicular to the exit pupil is at the center wavelength.

3. The optical channel according to claim 2, wherein:
the second portion of the expanded light that exits the optical channel body non-perpendicular to the exit pupil exhibits a greater intensity than the first portion of the expanded light that exits the optical channel body perpendicular to the exit pupil.

4. The optical channel according to claim 1, wherein the front surface is adjacent to the exit pupil and the optical channel body is a see-through exit pupil expander further comprising:
a compensating wedge disposed adjacent to a portion of the back surface opposite the exit pupil, said compensating wedge transparent to incident environmental light and geometrically configured to offset angular variance the optical channel body imposes on incident environmental light that passes into the optical channel body via the compensating wedge.

5. The optical channel according to claim 4, wherein the front and back surfaces define at least first and second discrete geometric segments of the optical channel body, wherein the front and back surfaces are parallel in the first discrete geometric segment and non-parallel in at least the second discrete geometric segment.

6. The optical channel according to claim 1, wherein:
the front and back surfaces of the optical channel body are parallel; and
disposition of a distal end of the wedge overlay relative to the entrance pupil filters incident light passing through the entrance pupil such that only wavelengths above or below a threshold experience the angularly varying total internal reflection while remaining wavelengths experience total internal reflection that is not angularly varying.

7. An optical channel comprising:
an optical channel body;
an entrance pupil enabling light to enter the optical channel body;
an exit pupil enabling the light to exit the optical channel body;
a back surface adjacent to the entrance pupil;
a front surface opposite the back surface;
wherein the optical channel body is configured such that a first distance at the entrance pupil between the front surface and the back surface is different from a second distance at the exit pupil between the front surface and the back surface and
a wedge overlay, wherein:
the front and back surfaces are front and back surfaces of the optical channel body;
the wedge overlay defines non-parallel front and back overlay surfaces;
the wedge overlay is disposed adjacent to the front surface of the optical channel body opposite the entrance pupil such that the first distance is between the back surface of the optical channel body and the front overlay surface; and
at least some of the light entering the optical channel body via the entrance pupil is reflected from the front overlay surface back into the optical channel body towards the back surface of the optical channel body.

8. The optical channel according to claim 7, wherein the front and back surfaces of the optical channel are configured to form a continuous wedge defining an angle α that quantifies an amount of non-parallelism between them.

9. The optical channel according to claim 8, wherein the first distance is greater than the second distance.

10. The optical channel according to claim 7, wherein the front surface is adjacent to the exit pupil and the optical channel body is a see-through exit pupil expander further comprising:
a compensating wedge disposed adjacent to a portion of the back surface opposite the exit pupil, said compensating wedge transparent to incident environmental light and geometrically configured to offset exit pupil expansion that the optical channel body imposes on incident environmental light that passes into the optical channel body via the compensating wedge.

11. The optical channel according to claim 7, wherein the front and back surfaces define at least first and second discrete geometric segments of the optical channel body, wherein the front and back surfaces are parallel in the first discrete geometric segment and non-parallel in at least the second discrete geometric segment.

12. The optical channel according to claim 7, wherein:
the front and back surfaces of the optical channel body are parallel; and
disposition of a distal end of the wedge overlay relative to the entrance pupil filters incident light passing through the entrance pupil such that only wavelengths above or below a threshold are reflected from the front overlay surface into the optical channel body while remaining wavelengths reflected from the front overlay surface are not.

13. A head-wearable imaging device comprising a micro display and an exit pupil expander, wherein the exit pupil expander comprises:
an optical channel body;
an entrance pupil configured to in-couple light from the micro-display;
an exit pupil configured to out-couple light from the exit pupil expander;
a back surface adjacent to the entrance pupil; and
a front surface opposite the back surface, wherein the optical channel body is geometrically configured such that the front surface and the back surface are non-parallel; wherein the exit pupil expander is geometrically configured such that the light defining a center wavelength that enters the optical channel body at the entrance pupil perpendicular to the back surface experiences angularly varying total internal reflection between the front and back surfaces such that the light that exits the optical channel body perpendicular to the exit pupil is at a wavelength shifted from the center wavelength;
and
a wedge overlay, wherein:
the said front and back surfaces are front and back surfaces of the optical channel body;
the wedge overlay defines non-parallel front and back overlay surfaces;
the wedge overlay is disposed adjacent to the front surface of the optical channel body opposite the entrance pupil; and
at least some of the angularly varying total internal reflection between the front and back surfaces are between the front surface of the wedge overlay and the back surface of the optical channel body.

14. The head-wearable imaging device according to claim 13, wherein the at least portion of the front and back surfaces that are non-parallel are flat.

15. The head-wearable imaging device according to claim 13, wherein the head-wearable imaging device is a virtual reality imaging device.

16. The head-wearable imaging device according to claim 13, wherein the head-wearable imaging device is an augmented reality device further comprising a compensating wedge disposed opposite the exit pupil such that incident environmental light that passes into the exit pupil expander through the compensating wedge passes out of the exit pupil expander through the exit pupil without total internal reflection.

* * * * *